United States Patent
Ma et al.

(10) Patent No.: US 9,274,580 B2
(45) Date of Patent: Mar. 1, 2016

(54) VOLTAGE REGULATOR SUPPLYING POWER EXCLUSIVELY TO A NON-CORE REGION OF A PROCESSOR HAVING A SUPPLY CAPABILITY THRESHOLD

(75) Inventors: Ruoying Mary Ma, Portland, OR (US); Craig Forbell, Los Gatos, CA (US); Soethiha Soe, Beaverton, OR (US); Jawad Haj-Yihia, Haifa (IL); Jeffrey Carlson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 280 days.

(21) Appl. No.: 13/537,319

(22) Filed: Jun. 29, 2012

(65) Prior Publication Data

US 2014/0006833 A1   Jan. 2, 2014

(51) Int. Cl.
| | |
|---|---|
| G06F 1/00 | (2006.01) |
| G06F 11/30 | (2006.01) |
| G06F 1/28 | (2006.01) |
| G06F 1/32 | (2006.01) |
| G06F 1/26 | (2006.01) |
| G06F 1/30 | (2006.01) |

(52) U.S. Cl.
CPC .. *G06F 1/28* (2013.01); *G06F 1/26* (2013.01); *G06F 1/30* (2013.01); *G06F 1/3203* (2013.01)

(58) Field of Classification Search
CPC ............ G06F 1/30; G06F 1/3203; G06F 1/26
See application file for complete search history.

(56) References Cited

U.S. PATENT DOCUMENTS

| | | | |
|---|---|---|---|
| 6,564,332 B1* | 5/2003 | Nguyen et al. | 713/340 |
| 7,337,339 B1* | 2/2008 | Choquette et al. | 713/320 |
| 8,635,470 B1* | 1/2014 | Kraipak et al. | 713/300 |
| 2002/0070718 A1* | 6/2002 | Rose | 323/269 |
| 2007/0070673 A1* | 3/2007 | Borkar et al. | 365/63 |
| 2008/0104425 A1* | 5/2008 | Gunther et al. | 713/300 |
| 2008/0168287 A1* | 7/2008 | Berry et al. | 713/323 |
| 2009/0141783 A1 | 6/2009 | Kirrmann | |
| 2010/0026275 A1 | 2/2010 | Walton | |
| 2010/0077232 A1 | 3/2010 | Jahagirdar et al. | |
| 2010/0169690 A1* | 7/2010 | Mundada et al. | 713/340 |
| 2012/0166837 A1 | 6/2012 | Henry et al. | |
| 2012/0166854 A1 | 6/2012 | Rotem et al. | |

FOREIGN PATENT DOCUMENTS

KR   10-2005-0016645 A   2/2005

OTHER PUBLICATIONS

International Search Report and Written Opinion received for Patent Application No. PCT/US2013/047889, mailed on Oct. 9, 2013, 13 pages.

* cited by examiner

*Primary Examiner* — Mohammed Rehman
*Assistant Examiner* — Gayathri Sampath
(74) *Attorney, Agent, or Firm* — Jordan IP Law, LLC

(57) ABSTRACT

Systems and methods may provide for monitoring a current provided from a voltage regulator to a non-core region of a processor, and asserting a throttle signal to the non-core region of the processor if the current exceeds a supply capability threshold of the voltage regulator. In one example, a specified current supply capability of the non-core region is greater than a current supply capability of the voltage regulator, and the supply capability threshold is less than the specified current supply capability of the non-core region and an over current protection threshold of the non-core region.

28 Claims, 2 Drawing Sheets

VOLTAGE REGULATOR SUPPLYING POWER EXCLUSIVELY TO A NON-CORE REGION OF A PROCESSOR HAVING A SUPPLY CAPABILITY THRESHOLD

BACKGROUND

1. Technical Field

Embodiments generally relate to power management in computing platforms. More particularly, embodiments relate to the selective throttling of non-core processor regions based on voltage regulator current levels.

2. Discussion

As computing platforms become smaller and more lightweight, a number of power management concerns may be encountered. For example, the ability to reduce platform size can be limited by the size of the voltage regulator (VR) components that provide power to the various processors and other circuits of the platform. Moreover, VR component size may be a function of a specified maximum amount of current (e.g., $I_{ccmax}$) that VRs are expected to be capable of supplying. While computing platforms could be designed to have VRs with a current supplying capability that is less than the specified amount, such an approach may increase the risk of VR shutdown or lifetime degradation. Indeed, downsizing VRs that supply non-core processor regions of the platform may be particularly problematic given a traditional lack of protection mechanisms in those regions.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having circuitry to monitor a current provided from a voltage regulator to logic of a processor. The circuitry may also assert a throttle signal to the logic of the processor if the current exceeds a supply capability threshold associated with the voltage regulator.

Embodiments may also include a non-transitory computer readable storage medium having a set of instructions which, if executed by a device, cause the device to monitor a current provided from a voltage regulator to logic of a processor. The instructions, if executed, may also cause the device to assert a throttle signal to the logic of the processor if the current exceeds a supply capability threshold associated with the voltage regulator.

Other embodiments may include a computer implemented method in which a current provided from a voltage regulator to logic of a processor is monitored. The method may also provide for asserting a throttle signal to the logic of the processor if the current exceeds a supply capability threshold associated with the voltage regulator.

Additionally, embodiments may include a system having a voltage regulator with an associated supply capability threshold, and a processor having logic coupled to the voltage regulator. The system can also include circuitry to monitor a current provided from the voltage regulator to the logic of the processor, and assert a throttle signal to the logic of the processor if the current exceeds the supply capability threshold associated with the voltage regulator, wherein the logic is to reduce a workload of the logic in response to the throttle signal.

Figure 1:
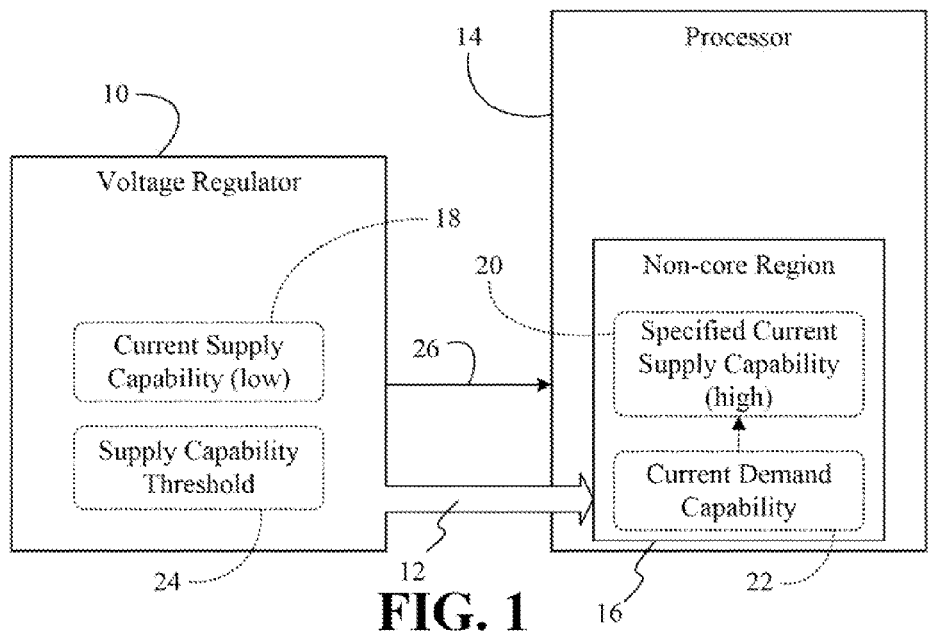
FIG. 1 is a block diagram of an example of a throttling scheme according to an embodiment.

Turning now to FIG. 1, a voltage regulator 10 is shown, wherein the voltage regulator 10 provides a power plane 12 (e.g., $V_{cc}$) to logic such as a non-core region 16 of a processor 14. The processor 14 may be, for example, a central processing, unit (CPU), input output (IO) controller, memory controller, display controller, and so forth, of a computing platform, wherein the illustrated non-core region 16 (e.g., "uncore") represents the elements in the processor 14 that are not used for computational tasks. As will be discussed in greater detail, the voltage regulator 10 may be sized to facilitate deployment of the voltage regulator 10 in a relatively small computing platform such as an "Ultrabook" computing system or other mobile device having a thin and/or small form factor. For example, relatively low rated inductors, FETs (field effect transistors) and other components may be used to construct the voltage regulator 10. The small size of the voltage regulator 10 may result in the voltage regulator 10 having an associated maximum current supply capability 18 (e.g., $I_{ccmax\_vr}$) that is less than a maximum current supply capability 20 specified for the non-core region 16 (e.g., $I_{ccmax}$). In other words, the specified current supply capability 20, which may be a function of a current demand capability 22 of the non-core region 16, exceeds the current supply capability 18 of the voltage regulator 10, in the example shown.

In order to obviate any concerns over shutdown or lifetime degradation due to such a supply capability mismatch, the illustrated voltage regulator 10 monitors the current/power provided from the voltage regulator 10 to the non-core region 16 (e.g., low side and/or high side FET current), and asserts a throttle signal 26 (e.g., $I_{ccmax\_throttle}$) to the non-core region 16 if the current exceeds a supply capability threshold 24 associated with the voltage regulator 10. Assertion of the throttle signal 26 may be done very quickly (e.g., less than one micro-second). The supply capability threshold 24 may be less than the specified current supply capability 20 of the non-core region 16 as well as less than the current supply capability 18 of the voltage regulator 10. The supply capability threshold 24 may also be less than an over current protection (OCP) threshold (not shown) of the non-core region 16, wherein the gap between the supply capability threshold 24 and the OCP threshold may be selected based on the throttling response time of the non-core region 44.

In response to receiving the throttle signal 26, the non-core region 16 may reduce its internal workload, which can in turn reduce the current demand placed on the voltage regulator 10 by the non-core region 16. Thus, the illustrated throttle signal 26 enables the voltage regulator 10 to be downsized without risking shutdown or lifetime degradation. The throttle signal 26 may be provided either directly to the non-core region 16 (e.g., via a dedicated pin) or indirectly to the non-core region 16 via the processor 14, which may in turn control the workload of the non-core region 16.

Figure 2:
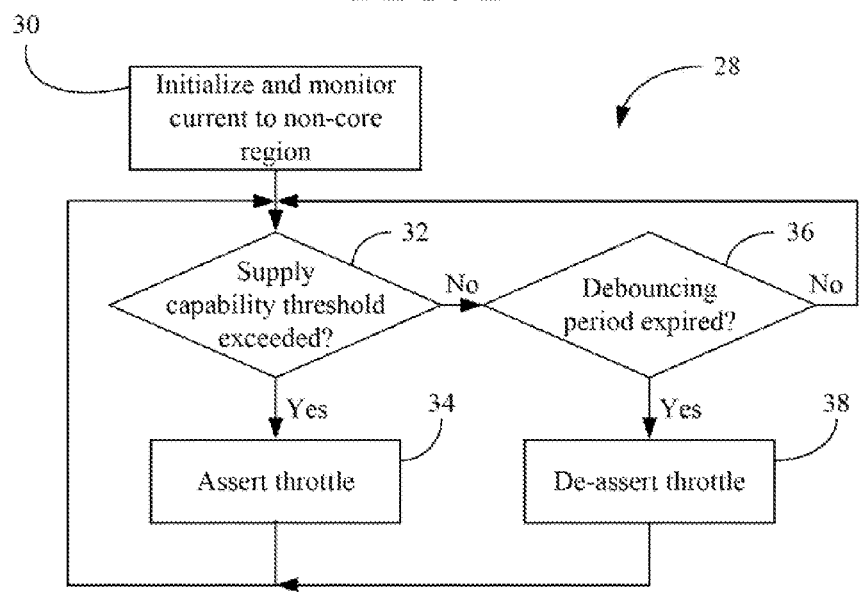
FIG. 2 is a flowchart of an example of a method of throttling a non-core region of a processor according to an embodiment.

FIG. 2 shows a method 28 of throttling a non-core region of a processor. The method 28 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 30 provides for initializing a system having a voltage regulator that supplies power to a non-core region of a processor. The initialization process may involve determining and/or setting a supply capability threshold of the voltage regulator (e.g., via accessing a register, memory location, etc.). In one example, the supply capability threshold is less than a specified current supply capability of non-core region, wherein the specified current supply capability of the non-core region is greater than a current supply capability of the voltage regulator. Block 30 may also provide for monitoring the current and/or power supplied by the voltage regulator to the non-core region. If it is determined at block 32 that the current exceeds the supply capability threshold, a throttle signal can be asserted to the non-core region at block 34 and the illustrated loop repeats. As already noted, the throttle signal may cause a reduction of the workload of the non-core region, which in turn may result in a reduction in the current demand placed on the voltage regulator by the non-core region.

If, on the other hand, the supply capability threshold is not exceeded, a determination may be made at block 36 as to whether a predetermined period of time (e.g., a "debouncing period") has expired. The debouncing period may be used to reduce the likelihood of fluctuations and associated adjustments occurring around supply capability threshold. If the debouncing period has expired, illustrated block 38 de-asserts the throttle signal and the current monitoring continues.

Figure 3:
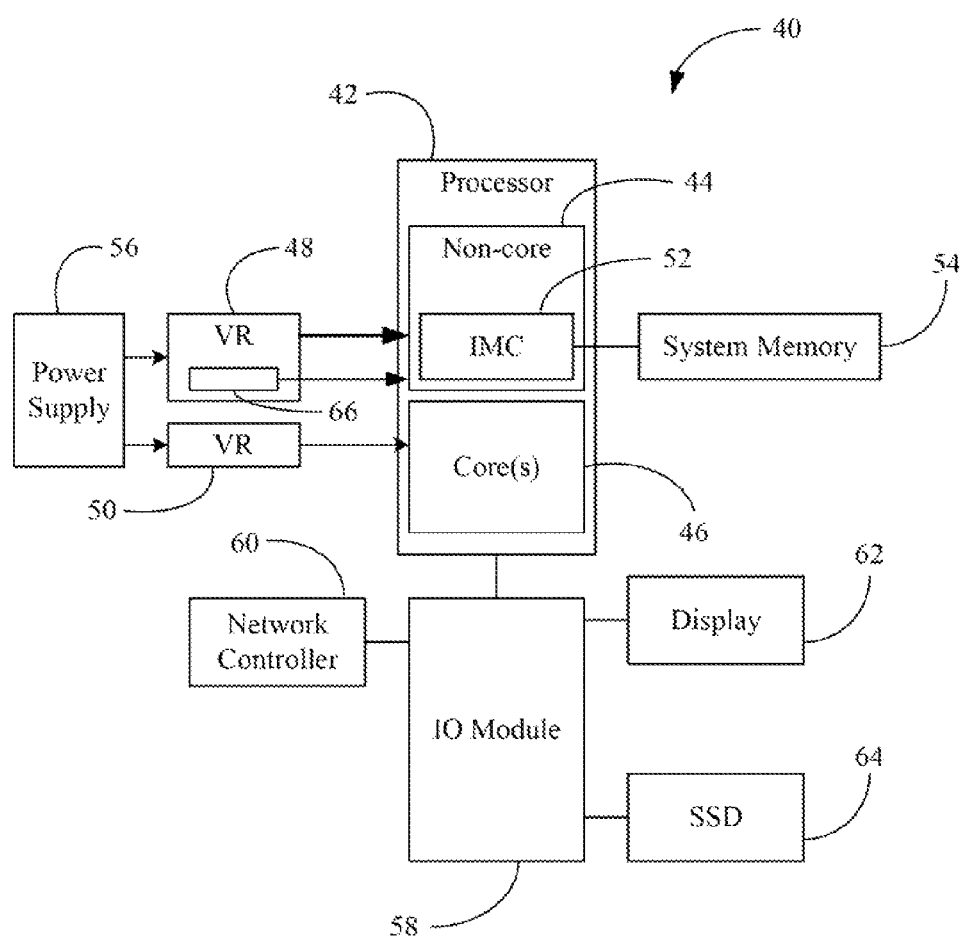
FIG. 3 is a block diagram of an example of a computing platform according to an embodiment.

Turning now to FIG. 3 a platform 40 is shown, wherein the platform 40 may be part of a device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, a processor 42 has a non-core region 44 and a core region 46. The non-core region 44 may include, for example an integrated memory controller 52 that facilitates communication between the processor 42 and system memory 54, wherein the system memory 54 could include, for example, double data rate (DDR) synchronous dynamic random access memory (SDRAM, e.g., DDR3 SDRAM JEDEC Standard JESD79-3C, April 2008) modules. The modules of the system memory 76 may be incorporated into a single inline memory module (SIMM), dual inline memory module (DIMM), small outline DIMM (SODIMM), and so forth. Thus, the illustrated non-core region 44 does not perform computational operations. The core region 46, on the other hand, may have full computational functionality with instruction fetch units, instruction decoders, level one (L1) cache, execution units, and so forth.

In the illustrated example, the non-core region 44 receives power from a voltage regulator (VR) 48 and the core region 46 receives power from a different VR 50, wherein the VRs 48, 50 convert supply voltages received from a power supply 56 to voltages used by the respective circuits supported by the VRs 48, 50. The computing platform 40 may also include an input output (IO) module 58, network controller 60, display controller 62, solid state disk (SSD) 64, etc., to support off-platform communications, facilitate information storage, and enable the visual output of information. The IO module 58, network controller 60, display controller 62, and SSD 64, may also have non-core regions that receive power from platform VRs.

The VR 48 that supplies the non-core region 44 may have a current supply capability that is less than a specified current supply capability of the non-core region 44. Accordingly, the illustrated VR 48 has logic 66 configured to selectively assert a throttle signal to the non-core region 44 based on whether the current supplied to the non-core region 44 exceeds a supply capability threshold of the VR 48. In one example, the supply capability threshold is set to a value that is less than the specified current supply capability of the non-core region 44 in order to prevent shutdown and/or damage in the VR 48 during operation. The supply capability threshold may also be less than an over current protection threshold associated with the non-core region 44 to provide additional protection to the non-core region 44.

Techniques described herein may therefore use reduced $I_{ccmax}$ design points for VRs to enable integration of the VRs with smaller components, lower cost, and higher efficiency. Closed loop detection and protection mechanisms can enable safe downsizing of non-core VRs on a platform having tight space requirements.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. are used herein only to facilitate discussion, and carry no particular temporal or chronological significance unless otherwise indicated. Moreover, any use of the terms "first", "second", etc., does not limit the embodiments discussed to the number of components listed.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a voltage regulator having a supply capability threshold;
   a processor including logic coupled to the voltage regulator to supply power substantially exclusively to a non-core region of the processor, wherein the non-core region is not to perform computational operations and is not to supply power to a core region of the processor; and
   circuitry to,
   monitor a current provided from the voltage regulator to the logic of the processor, and
   selectively assert a throttle signal to the logic of the processor if the current exceeds the supply capability threshold of the voltage regulator, wherein the logic is to reduce a workload of the logic in response to the throttle signal to reduce the current demand placed on the voltage regulator by the non-core region of the processor, wherein the logic has an associated over current protection threshold and the supply capability threshold is less than the over current protection threshold.

2. The system of claim 1, wherein the logic has a specified current supply capability that is greater than a current supply capability of the voltage regulator, and wherein the supply capability threshold is less than the specified current supply capability of the logic.

3. The system of claim 1, wherein the circuitry is to de-assert the throttle signal if the current does not exceed the supply capability threshold for a predetermined period of time.

4. The system of claim 1, wherein the processor includes an input output (IO) controller.

5. The system of claim 1, wherein the processor includes a memory controller.

6. The system of claim 1, wherein the processor includes a display controller.

7. The system of claim 1, wherein the logic is a non-core region of the processor.

8. An apparatus comprising:
   circuitry to, monitor a current provided from a voltage regulator to logic of a processor, wherein the logic is to supply power substantially exclusively to a non-core region of the processor, and wherein the non-core region is not to perform computational operations and is not to supply power to a core region of the processor, and
   selectively assert a throttle signal to the logic of the processor if the current exceeds a supply capability threshold of the voltage regulator, wherein the logic is to reduce a workload of the logic in response to the throttle signal to reduce the current demand placed on the voltage regulator by the non-core region of the processor, wherein the supply capability threshold is to be less than an over current protection threshold associated with the logic of the processor.

9. The apparatus of claim 8, wherein a specified current supply capability of the logic is to be greater than a current supply capability of the voltage regulator, and wherein the supply capability threshold is to be less than the specified current supply capability of the logic.

10. The apparatus of claim 8, wherein the circuitry is to de-assert the throttle signal if the current does not exceed the supply capability threshold for a predetermined period of time.

11. The apparatus of claim 8, wherein the throttle signal is to be asserted to an input output (IO) controller.

12. The apparatus of claim 8, wherein the throttle signal is to be asserted to a memory controller.

13. The apparatus of claim 8, wherein the throttle signal is to be asserted to a display controller.

14. The apparatus of claim 8, wherein the throttle signal is to be asserted to a non-core region of the processor.

15. A non-transitory computer readable storage medium comprising a set of instructions which, if executed by a device, cause the device to:
    monitor a current provided from a voltage regulator to logic of a processor, wherein the logic is to supply power substantially exclusively to a non-core region of the processor, and the non-core region is not to perform computational operations and is not to supply power to a core region of the processor; and
    selectively assert a throttle signal to the logic of the processor if the current exceeds a supply capability threshold of the voltage regulator, wherein the logic is to reduce a workload of the logic in response to the throttle signal to reduce the current demand placed on the voltage regulator by the non-core region of the processor, wherein the supply capability threshold is to be less than an over current protection threshold associated with the logic of the processor.

16. The medium of claim 15, wherein a specified current supply capability of the logic is to be greater than a current supply capability of the voltage regulator, and wherein the supply capability threshold is to be less than the specified current supply capability of the logic.

17. The medium of claim 15, wherein the instructions, if executed, cause a device to de-assert the throttle signal if the current does not exceed the supply capability threshold for a predetermined period of time.

18. The medium of claim 15, wherein the throttle signal is to be asserted to an input output (IO) controller.

19. The medium of claim 15, wherein the throttle signal is to be asserted to a memory controller.

20. The medium of claim 15, wherein the throttle signal is to be asserted to a display controller.

21. The medium of claim 15, wherein the throttle signal is to be asserted to a non-core region of the processor.

22. A computer implemented method comprising:
    monitoring a current provided from a voltage regulator to logic of a processor, wherein the logic is to supply power substantially exclusively to a non-core region of the processor, and
    the non-core region does not perform computational operations and does not supply power to a core region of the processor; and
    selectively asserting a throttle signal to the logic of the processor if the current exceeds a supply capability threshold of the voltage regulator, wherein the logic is to reduce a workload of the logic in response to the throttle signal to reduce the current demand placed on the voltage regulator by the non-core region of the processor, wherein the supply capability threshold is to be less than an over current protection threshold associated with the logic of the processor.

23. The method of claim 22, wherein a specified current supply capability of the logic is greater than a current supply capability of the voltage regulator, and wherein the supply capability threshold is less than the specified current supply capability of the logic.

24. The method of claim 22, further including de-asserting the throttle signal if the current does not exceed the supply capability threshold for a predetermined period of time.

25. The method of claim 22, wherein the throttle signal is asserted to an input output (IO) controller.

26. The method of claim 22, wherein the throttle signal is asserted to a memory controller.

27. The method of claim 22, wherein the throttle signal is asserted to a display controller.

28. The method of claim 22, wherein the throttle signal is asserted to a non-core region of the processor.

\* \* \* \* \*